(12) United States Patent
Coley et al.

(10) Patent No.: US 9,124,786 B1
(45) Date of Patent: Sep. 1, 2015

(54) PROJECTING CONTENT ONTO SEMI-PERSISTENT DISPLAYS

(75) Inventors: Christopher D. Coley, Morgan Hill, CA (US); Beverly L. Harrison, Palo Alto, CA (US); William Thomas Weatherford, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 565 days.

(21) Appl. No.: 13/531,291

(22) Filed: Jun. 22, 2012

(51) Int. Cl.
*G03B 21/26* (2006.01)
*H04N 5/222* (2006.01)

(52) U.S. Cl.
CPC ..................... *H04N 5/222* (2013.01)

(58) Field of Classification Search
CPC . G03B 21/204; H04N 9/3129; H04N 9/3191; H04N 9/3194
USPC .............. 353/28; 455/3.06; 178/18.01–18.11, 178/19.01–19.07, 20.01–20.04; 434/408
See application file for complete search history.

(56) References Cited

U.S. PATENT DOCUMENTS

| 5,649,827 A * | 7/1997 | Suzaki .......................... 434/284 |
| 2005/0078879 A1 * | 4/2005 | Sakurai et al. ................ 382/275 |

FOREIGN PATENT DOCUMENTS

WO  WO2011088053  7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Sultan Chowdhury
*Assistant Examiner* — Danell L Owens
(74) *Attorney, Agent, or Firm* — Lee & Hayes, PLLC

(57) ABSTRACT

Described herein are systems and techniques for periodically projecting content onto a display medium that is configured to display images for a finite amount of time, during which time the images decay until the image substantially or entirely disappears from the display medium. That is, the systems and techniques may project light onto the display medium, with the light energizing particles of the display medium to display a predefined image.

36 Claims, 5 Drawing Sheets

PROJECTING CONTENT ONTO SEMI-PERSISTENT DISPLAYS

BACKGROUND

Passive display screens are used to present images that are projected by a projector. For instance, home entertainment systems often use projection systems to project images onto a passive screen to provide a big screen, high quality viewing experience. However, typical passive screens require that the projection system continuously project content in order for the passive screens to display the projected content.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
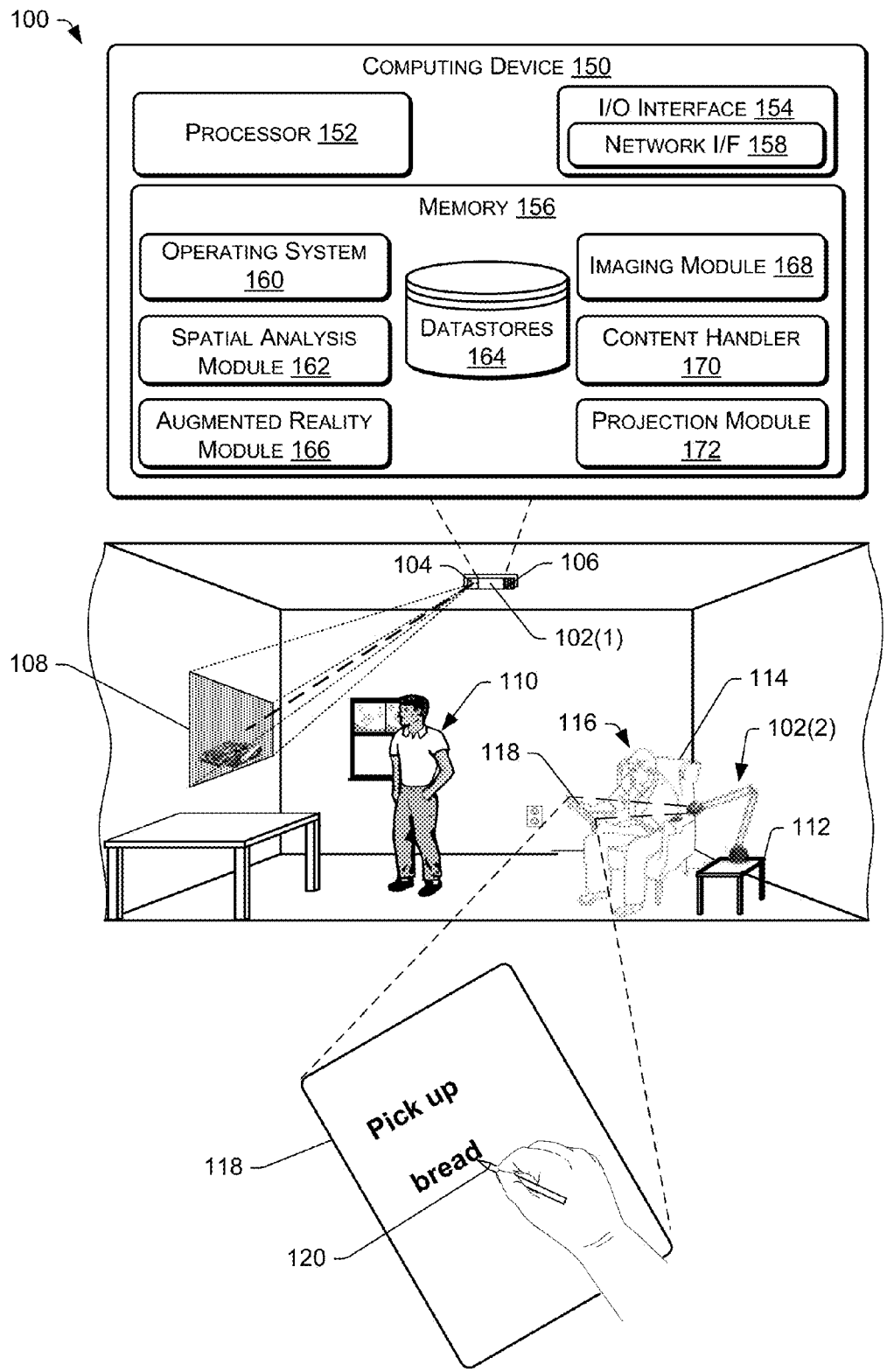
FIG. 1 shows an example environment where a camera may identify an image written by a user on a display medium within the environment. In response, a projector may periodically project the image onto the same or a different display medium. In either case, the display medium receiving the projection may be configured to display the projected content for a finite period of time after the projector ceases projecting the content.

Projection systems are used in a variety of environments including movie theaters, conference rooms, classrooms, homes, and so forth. These projection systems include a projector configured to emit light towards a projection surface or screen. The projection surface, or display medium, is configured to accept and scatter the light such that an image is presented to viewers. The display medium may be fixed, such as one that mounts to a wall or a stand, or portable, such as a handheld projection screen.

Described herein are systems and techniques for periodically projecting content onto a display medium that is configured to display images for a finite amount of time, during which time the images decay until the image substantially or entirely disappears from the display medium. That is, the systems and techniques may project light onto the display medium, with the light energizing particles of the display medium to display a predefined image. Such display mediums may include phosphorescent material, fluorescent material, or a combination thereof. After some time, the predefined image may "decay", meaning that the particles on the display medium may settle back to an energized state at which the particles, and hence the image, will no longer be visible.

In another example, the display medium may comprise an electronic paper display, such as an electrophoretic display, a Gyricon display, an electrowetting display, or any other display that mimics ink on paper. The electronic paper display may include multiple particles within respective capsules, as well as photocells associated with respective capsules. The photocells may receive light from a projector to charge the particles, thus moving the particles to appropriate positions within the capsules to collectively display the predefined image. In instances where the electronic paper display is monochromatic, the projector (or another projector) may project color pixels atop the electronic paper display, thus creating a full color image.

In one example, after a projector of the system projects light onto the display medium the projector may cease the projecting, after which time the display medium will continue to display the image. Sometime thereafter, the projector may again project the light onto the display medium to re-energize the particles and cause the display medium to display the image with a greater intensity (given that the intensity of the image has decayed over the time during no projection has occurred). By periodically projecting the light, the system thus allows for display of an image without the need to continuously project onto the display medium.

In some instances, a camera may first capture one or more images of the display medium to determine an image or illustration that is present on the display medium. For instance, a user may first utilize a writing tool to draw on the display medium. In the example where the display medium includes phosphorescent and/or fluorescent material, the user may utilize a writing tool that includes a light on its tip. Similar to the projected light, the light emitted from the writing tool may energize the particles of the display medium, thus causing the display medium to display the image drawn by the user. The light from the writing tool and/or the projector may comprise visible light, non-visible light, or a combination thereof.

After capturing the images of the display medium, the system may identify the image on the display medium and determine content to project upon the display medium based on the image. For instance, the system may attempt to replicate the image or may project additional or alternative content. In one example, the system may identify that the user has written a note (e.g., "pick up bread") or has drawn a particular illustration (e.g., an illustration of a star). In response, the projector may project light onto the display medium to replicate the note or the illustration, with the light being visible or non-visible to the naked human eye. That is, the projected light may be from any portion of the light spectrum. As discussed above and in further detail below, the projector may periodically project this light such that the display medium continues to display the image both when the projector is currently projecting onto the display medium and when the projector is not.

In another example, the system may determine to project content that is different than or supplemental to the image identified on the display medium. For instance, the system may perform handwriting recognition to identify content written by the user. As such, if the user misspells a word (e.g., "pick up bred"), the system may project the word with the corrected spelling (e.g., "pick up bread"). Or, the projector may "clean up" the user's handwriting and project the substantive content of the note in a neater fashion (e.g., in a particular known font). In another example, the system may determine to project supplemental content (e.g., a picture of a loaf of bread) in addition or instead of the note. In some instances, the projector (or another projector) may also project a visible image (e.g., continuously) in addition to projecting the light that, upon receipt at the medium, causes particles of the medium to energize and display an image.

In each of the instances, after determining the content to project onto the display medium, the system may thereafter project the content onto the display medium or onto another display medium. For instance, if a user writes the note discussed above ("pick up bread") onto a display medium hanging on a wall, the system may project light effective to energize particles of the display medium to display the same note. In some instances, the projector may project this light immediately after determining the content to project, while in other instances the projector may wait a certain amount of time until the note drawn by the user has decayed on the display medium to a certain threshold value. The system may determine this timing based on a calculation of known decay times associated with the display medium, by analyzing images captured by the camera, or the like.

In either instance, after projecting the light onto the display medium, the intensity of the image may be increased due to the re-energizing of the particles of the display medium. After projecting the light, the projector may cease the projecting, after which time the display medium may continue to display the image (although the image may continue to decay with time). Furthermore, the projector may modulate the intensity of the image on the display medium by modulating the length of time and/or the intensity of the projection. For instance, the projector may increase the intensity of the image on the medium by increasing the intensity of the projected light.

The projector may then periodically re-project the light until the system determines that it should no longer cause the display medium to display the image. This may be based on a receiving a request from a user to cease display of the image, based on a default setting, or the like. In some instances, the system may simply cease the projecting altogether, after which point the image will substantially or entirely disappear from the display medium (e.g., after one minute, ten minutes, an hour, etc.). As will be appreciated, the amount of time needed for the image to disappear will vary depending upon properties of the display medium. In another example, meanwhile, the projector may project different light onto the display medium that causes the image to disappear. For instance, the projector may project light that energizes each particle of the display medium to approximately the same level, thus causing the previously visible image to disappear, given that each particle of the display medium will appear substantially uniform.

In other implementations described below, a camera may image a first display medium and a projector may project content on a second, different display medium. For instance, if the system identifies that the user has written a note ("pick up bread") on a portable display medium, the projector may project content onto a different display medium. For instance, the projector may project light onto a display medium that is currently displaying a grocery list of the user. To illustrate, the projector may project light onto the display medium displaying the grocery list effective to add the word "bread" to the list.

In some instances, the display medium may include particles that are associated with respectively different colors. For instance, a display medium may include particles associated with the colors red, green, and blue. As such, the projector may project different wavelengths of light, with each wavelength energizing one set of the particles (e.g., red, green, or blue). Therefore, projecting the multiple frequencies of light may cause the display medium to display a color image.

The systems and techniques for periodically projecting content onto semi-persistent display mediums may be implemented in many ways. One illustrative implementation is described below in which the camera and projection system is implemented as part of an augmented relative environment within a room. However, the system may be implemented in many other contexts and situations in which images are projected onto screens for viewing consumption.

ILLUSTRATIVE ENVIRONMENT

FIG. 1 shows an illustrative environment 100 that may implement a system for periodically projecting content onto a semi-persistent display medium. In this illustration, the environment 100 may be an augmented reality environment created within a scene, and hosted within an environmental area, such as a room (e.g., room in a home, conference room, etc.). Two augmented reality functional nodes (ARFNs) 102(1)-(2) are shown within the room. Each ARFN contains projector(s), camera(s), and computing resources that are used to generate the augmented reality environment 100. In this illustration, the first ARFN 102(1) is a fixed mount system that may be mounted within the room, such as to the ceiling, although other placements are possible. The ARFN 102(1) includes a projector 104 and an associated camera 106 mounted on a common chassis. In this example, the projector 104 projects images onto a display medium 108 mounted or otherwise formed on a wall of the room. The projected images may be of any number of things, such as books, games (e.g., crosswords, Sudoku, etc.), news, magazines, movies, a browser, or the like. As illustrated, a first user 110 views the images that the projector 104 currently projects onto the display medium 108. In addition, the first user 110 may interact with the images being projected onto the display medium 108, and the camera 106 of the ceiling-mounted ARFN 102(1) may capture that interaction.

A second ARFN 102(2) is embodied as a table lamp, shown sitting on a small table 112 next to a chair 114. A second user 116 is seated in the chair 114 and is holding a portable display medium 118. The second ARFN 102(2) is equipped with a projector and a camera within the head of the lamp structure. The display medium 118 may be essentially any device for use within an augmented reality environment, and may be provided in several form factors. In the implementations described herein, the display medium 118 is an entirely passive, non-electronic, device. That is, the display medium 118 may be free from a power supply to power the display medium, such as a battery, a connection to an electrical socket, or the like.

In some instances, the display medium 108, the display medium 118, and/or other display mediums may include phosphorescent material, fluorescent material, or a combination thereof. While FIG. 1 illustrates the medium 118 as portable, in some instances the medium 118 may be attached a surface (e.g., a wall), may comprise a paint or coating (e.g., a wall having been painted or coated with a phosphorescent material), or the like.

Since in the illustrated example the display medium 118 may be moved by the user 116, the projector in the lamp-based ARFN 102(2) may be configured to track the display medium 118 during movement within the room and project an image onto it for presentation. Tracking may be accomplished by recognizing the shape of the display medium 118, following optical targets disposed on the screen, and so forth.

In addition to projecting visible images for the users 110 and 116, each ARFN 102 may also be used to create an augmented reality environment. In this situation, the projectors may further be used to project structured light patterns onto the surroundings of the room and the associated camera captures the images. The structured light patterns may use invisible light so that the users do not detect the patterns. In still other implementations, each ARFN 102 may employ IR-based illumination systems to illuminate a scene and time-of-flight sensors are used to help image the surrounding environment for creation of the augmented reality environment.

The projectors associated with ARFNs 102(1) and 102(2) may be implemented with any number of technologies capable of generating an image and projecting that image onto a surface. Suitable technologies include a digital micromirror device (DMD), liquid crystal on silicon display (LCOS), liquid crystal display, 3LCD, laser projector, and so forth. In some implementations, each ARFN may include a plurality of projectors to project images.

In the illustrated example, the user 116 writes a note onto the display medium 118. In instances where the display medium includes phosphorescent and/or fluorescent material, the user 116 may utilize a writing tool 120 having a light on its tip. The light may be effective to energize particles of the medium 118 to cause the medium to display the written message, "Pick up bread". The camera of the ARFN 102(2) may capture images of this display medium 118 to allow the ARFN 102(2) or another system to identify the image drawn by the user, as discussed in further detail below.

Associated with each ARFN 102(1)-(2), or with a collection of ARFNs, is a computing device 150, which may be located within the augmented reality environment 100 or disposed at another location external to it. Each ARFN 102 may be connected to the computing device 150 via a wired network, a wireless network, or a combination of the two. The computing device 150 has a processor 152, an input/output interface 154, and a memory 156. The processor 152 may include one or more processors configured to execute instructions. The instructions may be stored in memory 156, or in other memory accessible to the processor 152, such as storage in cloud-based resources.

The input/output interface 154 may be configured to couple the computing device 150 to other components, such as projectors, cameras, microphones, other ARFNs, other computing devices, and so forth. The input/output interface 154 may further include a network interface 158 that facilitates connection to a remote computing system, such as cloud computing resources. The network interface 158 enables access to one or more network types, including wired and wireless networks. More generally, the coupling between the computing device 150 and any components may be via wired technologies (e.g., wires, fiber optic cable, etc.), wireless technologies (e.g., RF, cellular, satellite, Bluetooth, etc.), or other connection technologies.

The memory 156 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 156 and configured to execute on a processor, such as the processor 152. An operating system module 160 is configured to manage hardware and services within and coupled to the computing device 150 for the benefit of other modules.

A spatial analysis module 162 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. The spatial analysis module 162 provides the information used within the augmented reality environment to provide an interface between the physicality of the scene and virtual objects and information.

One or more datastores 164 may be provided within the memory 156 or separate therefrom. Examples datastores include a system parameters datastore configured to maintain information about the state of the computing device 150, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

Another example datastore 164 is an object parameters datastore configured to maintain information about the state of objects within the scene. The object parameters may include the surface contour of the object, overall reflectivity, color, and so forth. This information may be acquired from the ARFN, other input devices, or via manual input and stored within the object parameters datastore.

Still another example datastore 164 is an object datastore configured to maintain a library of pre-loaded reference objects. This information may include assumptions about the object, dimensions, and so forth. For example, the object datastore may include a reference object of a beverage can and include the assumptions that beverage cans are either held by a user or sit on a surface, and are not present on walls or ceilings. The spatial analysis module 162 may use this data maintained in the datastore to test dimensional assumptions when determining the dimensions of objects within the scene. In some implementations, the object parameters in the object parameters datastore may be incorporated into the object datastore. For example, objects in the scene which are temporally persistent, such as walls, a particular table, particular users, and so forth may be stored within the object datastore. The object datastore may be stored on one or more of the memory of the ARFN, storage devices accessible on the local network, or cloud storage accessible via a wide area network.

An augmented reality module 166 is configured to generate augmented reality output in concert with the physical environment. The augmented reality module 166 may employ essentially any surface, object, or device within the environment 100 to interact with the users. The augmented reality module 166 may be used to track items within the environment that were previously identified by the spatial analysis module 162. The augmented reality module 166 includes a tracking and control module configured to track one or more items within the scene and accept inputs from or relating to the items.

The ARFNs 102 and computing components of device 150 that have been described thus far may be operated to create an augmented reality environment in which images are projected onto various surfaces and items in the room, and the users 110 and 116 may interact with the images. The users' movements, voice commands, and other interactions are captured by the ARFNs 102 to facilitate user input to the environment.

In addition, the memory 156 may have access to an imaging module. The imaging module may function to receive images (e.g., static images, a video stream, etc.) from a camera of the ARFN(s) and identify images therein. For instance, the imaging modules 168 may identify that the user 116 has written the note "Pick up bread" on the display medium 118. The imaging module 168 may then provide this information to a content handler 170.

Upon receiving the identification of the image from the image module 168, the content handler 170 may determine content to project upon the display medium 118 or another display medium. The content handler 170 may then provide corresponding instructions to the projection module 172, which in turn operates the projector of the ARFN (or the projector of another ARFN).

For instance, the projection module 172 may instruct the projector to periodically project the same image ("Pick up bread") onto the same display medium such that the user's note is persistently depicted on the display medium 118. That is, in instances where the display medium 118 is able to display the image for a finite amount of time, after which the image will have disappeared, the projector may periodically project light to re-energize particles of the display medium 118 to continue the display of the user's note. In another example, meanwhile, the projection module 172 may instruct the projector to project content (the same or different than the identified image) onto a different display medium other than or in addition to the display medium 118. In either instance, the system coupled with the semi-persistent display medium allows for continuous display of an image or images, despite the fact that the projector is projecting content onto the display medium times and refraining from projecting content onto the display medium at other times.

EXAMPLE IMPLEMENTATIONS

Figure 2A:
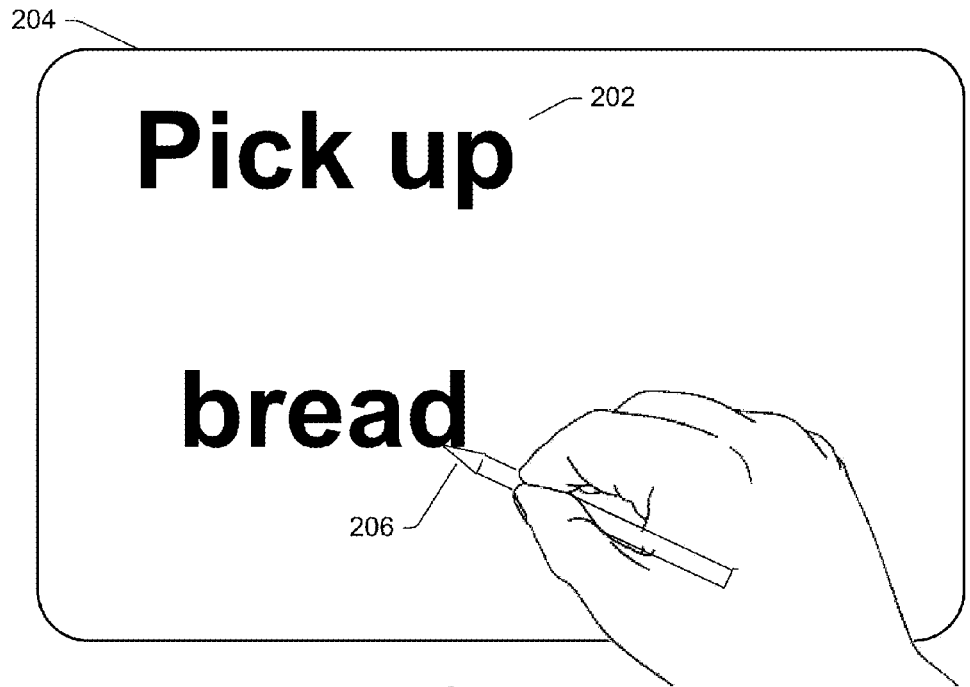
FIGS. 2A-2D illustrate an example process of a user drawing an image on a display medium that is configured to display the medium for a finite period of time, over which time the image decays from the display medium. The process then illustrates a camera identifying the image, the image decaying from the display medium and, thereafter, a projector projecting light onto the display medium effective to cause the display medium to display the image drawn by the user with a greater intensity.

FIGS. 2A-2D collectively illustrate an example process for utilizing the techniques described herein. First, FIG. 2A illustrates a user drawing an image 202 on a display medium 204 using a writing tool 206. As discussed above, the display medium 204 may be configured to display the medium for a finite period of time, over which time the image decays from the display medium until the image is no longer visible to the naked human eye (e.g., after one minute, ten minutes, one hour, etc.). For instance, the display medium 204 may include phosphorescent material and/or fluorescent material. The writing tool 206, meanwhile, may include a light at its tip such that the light energizes particles of the display medium, causing the display medium to display the image 202.

Furthermore, the writing tool 206 may include buttons or other interface means to select one of multiple different colors in which to write or draw, such as red, green, or blue. Upon selecting, for example, the button associated with red, the writing tool 206 may emit light of a particular frequency that energizes red particles in the display medium 204. Upon selecting a button associated with a different color, the tool 206 may emit light that energizes particles of the different color. Additionally, the tool 206 may include an "eraser" that, when selected (e.g., by turning the tool upside down), emits a light that causes the energized pixels to return to their original state, thus erasing any existing imagery on the display medium.

Figure 2B:
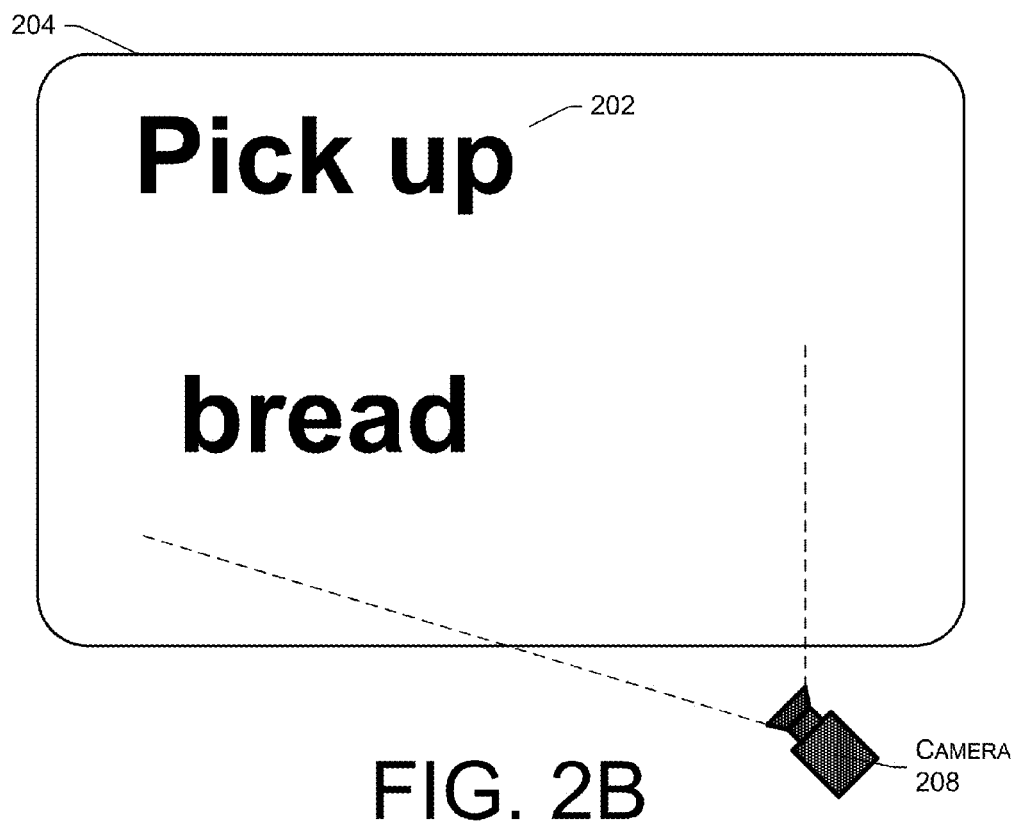

FIG. 2B illustrates that sometime after the user creates the image 202, a camera 208 captures one or more images of the display medium 204. These images may be used to identify the image 202 drawn by the user, which in turn may be used to determine content to later project onto the display medium 204 or another display medium.

Figure 2C:
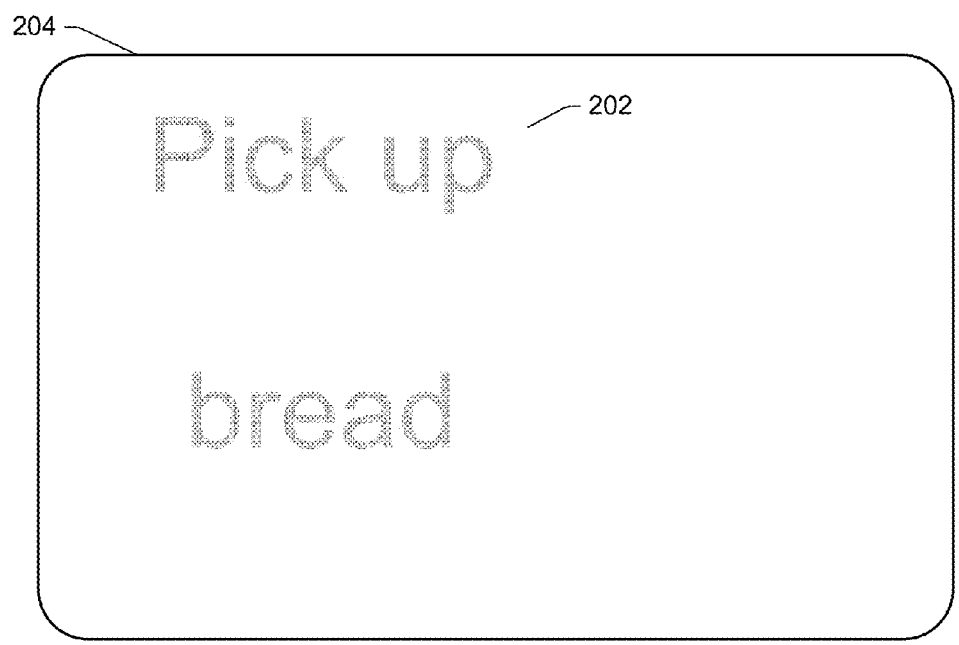

FIG. 2C illustrates that the image 202 will begin to decay after the user draws the image 202, given the properties of the display medium. For instance, a decay rate of the display medium 204 may determine how long it takes for the image 202 to decay to the point to where the image 202 is no longer visible to the human eye. For some materials and display mediums, the image might not be visible after one minute, ten minutes, an hour, a day, or the like.

Figure 2D:
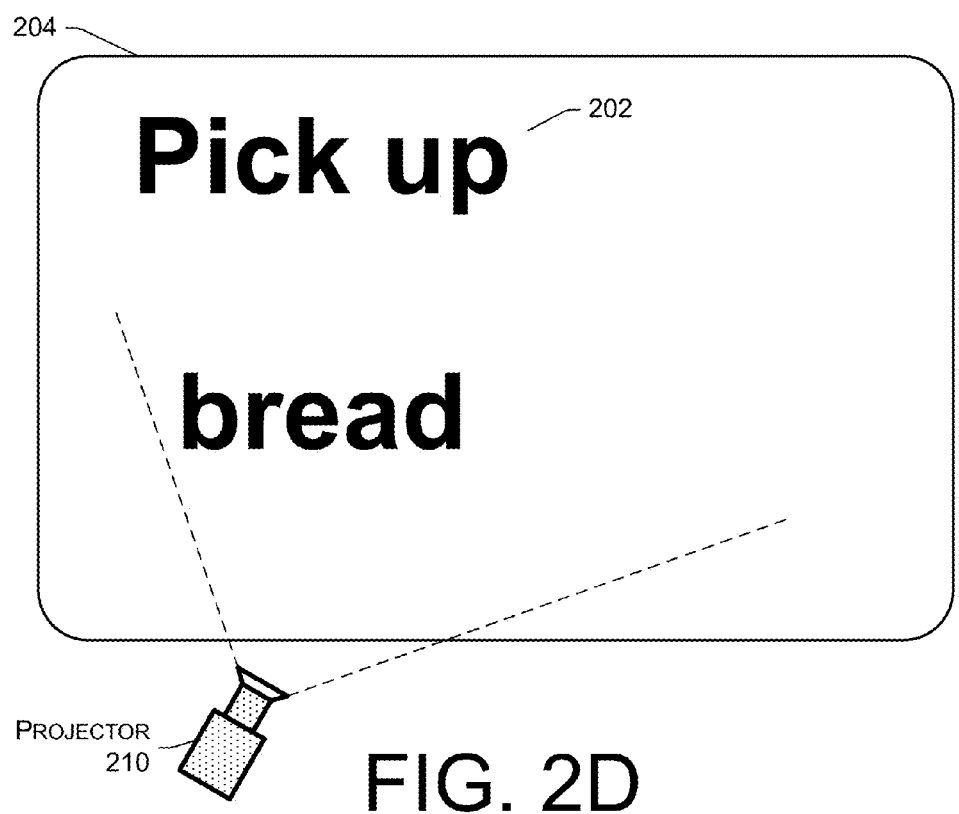

FIG. 2D illustrates that sometime before the image 202 entirely decays, a projector 210 may project light onto the display medium 204 effective to re-energize some of the particles of the display medium. In this example, the projector 210 projects light that is effective to cause the display medium 204 to re-display the original image 202. That is, the light may cause the display medium 204 to display the image 202 with a greater intensity than before the projection. Furthermore, the projector 210 may thereafter cease the projection of the light and may cycle between projecting the light and ceasing the projection of the light. As such, the image 202 may remain visible on the display medium 204 until the projector entirely ceases projecting the light (and the image 202 decays entirely) or until the projector 210 projects light that is effective to erase the image 202 from the medium 204.

In some instances, the frequency at which the projector 210 projects the light onto the display medium 204 may be calculated at least partly with reference to a decay rate associated with the display medium. For instance, if the display medium 204 is able to display the image for a relatively long time, then the projector 210 may project the light less frequently than if the display medium 204 is able to display the image for a relatively short time. Of course, the periodicity at which the projector projects light may also be based on other factors, such as user preferences, environmental conditions, and so forth.

Figure 3:
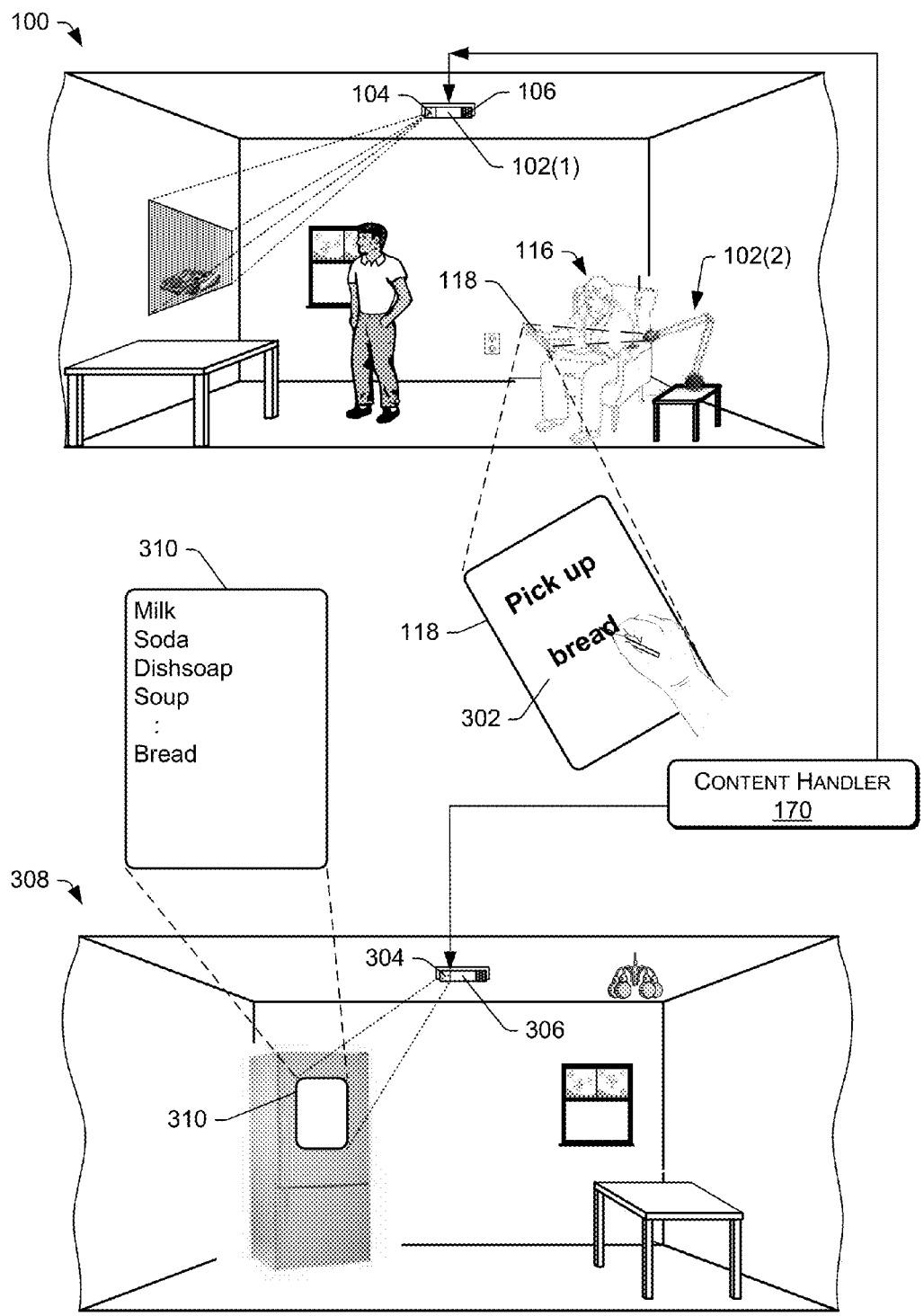
FIG. 3 illustrates an implementation where a camera in a first room identifies a user drawing an image and, in response, a projector in a second, different room projects content on a display medium in the second room. Again, the display medium may be configured to display the content for a finite amount of time and, therefore, the projector may periodically project the content onto the display medium as the content decays on the display medium.

FIG. 3 illustrates an implementation where a camera from the ARFN 102(2) in the first room 100 identifies the user 116 drawing an image 302 on the display medium 118. As discussed above, the camera and imaging module may identify the user 116 writing the note "Pick up bread" on the display medium 118. In response, the content handler 170 may determine that the term "bread" is a grocery item and, therefore, should be added to a grocery list of the user 116. As such, the content handler 170 may instruct a projector 304 of an ARFN 306 in a second, different room 308 to add the item "bread" to a grocery list maintained in the second room 308.

FIG. 3 accordingly illustrates the projector 304 projecting a grocery list, including the item "bread", onto a display medium 310 attached to the user's refrigerator. Again, the display medium 310 may be configured to display the content for a finite amount of time and, therefore, the projector 304 may periodically project the content onto the display medium 310.

ILLUSTRATIVE PROCESS

Figure 4:
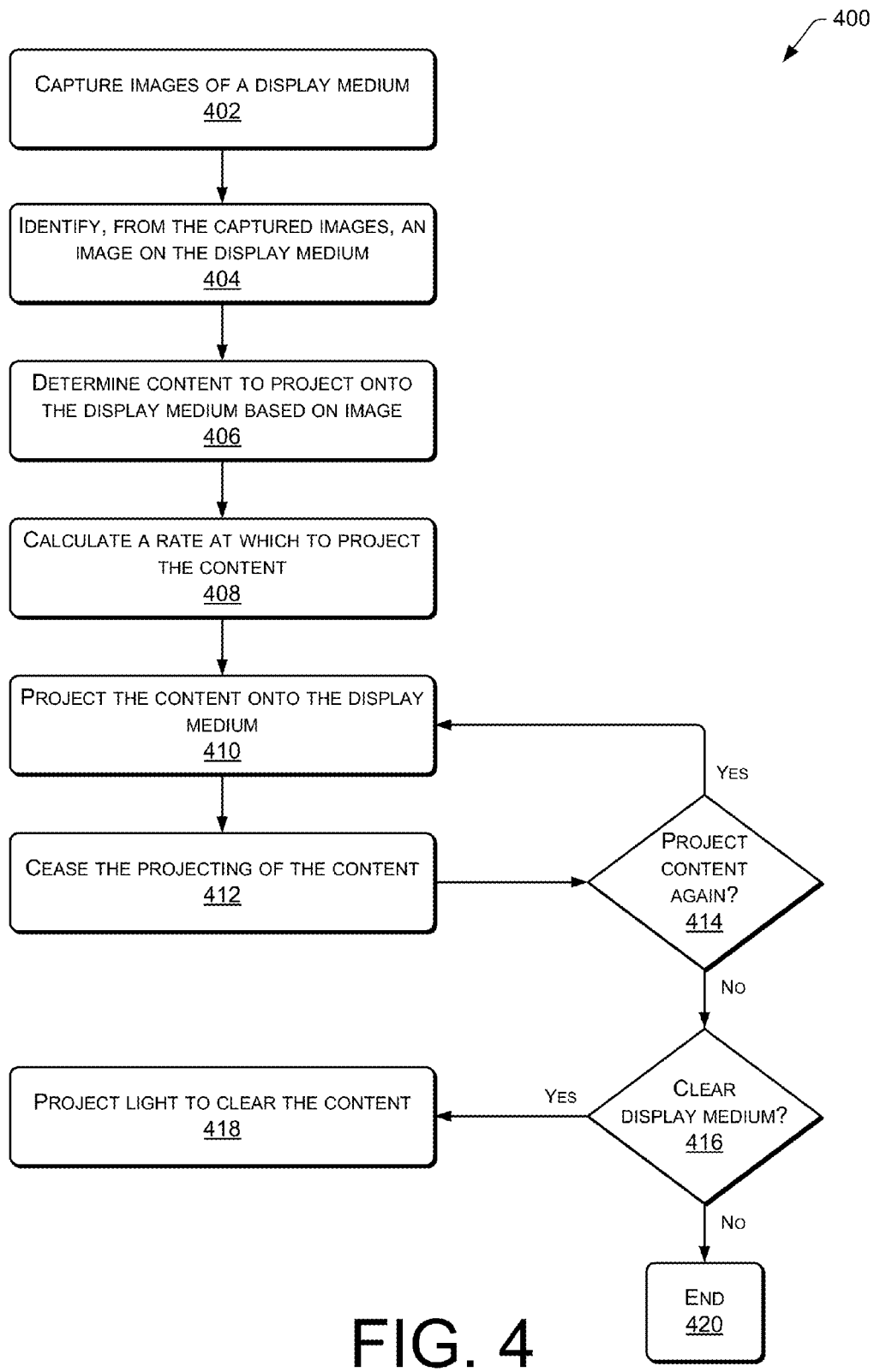
FIG. 4 is a flow diagram of an example process for identifying an image on a display medium, determining content to project based on the image, and periodically projecting the content onto the display medium, with the display medium displaying the content for a finite period of time after the projector ceases projection of the content.

FIG. 4 is a flow diagram of an example process 400 for identifying an image on a display medium, determining content to project based on the image, and periodically projecting the content onto the display medium, with the display medium displaying the content for a finite period of time after the projector ceases projection of the content. This process is illustrated as a collection of blocks in a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the processes.

At 402, the process 400 may capture one or more images of a display medium within an environment. For instance, a camera may capture one or more still images of the display medium or may capture a video stream of the environment that includes the display medium. At 404, the process 400 identifies, from the captured images, an image present on the display medium.

At 406, the process 400 then determines content to project onto the display medium (or another display medium) based on the identified image. This may include determining to project an image that substantially resembles the identified image, a modified version of substantive content of the identified image, content that is supplemental to the identified image, or the like.

At 408, the process calculates a rate at which to project the content onto the display medium. In some instances, the periodicity at which to project the content is based at least in part on a decay rate associated with the display medium.

At 410, the process 400 then projects content onto the display medium. This may include projecting light onto the display medium, effective to energize particles of the display medium and, therefore, cause the display medium to display a predefined image. At 412, meanwhile, the process 400 ceases the projecting of the content. The display medium, however, may continue to display the predefined image.

At 414, the process 400 determines whether to project the content again. This may be determined based on an preconfigured amount of time at which the display medium is to display the predefined image, based on whether a user has requested to cease display of the content or the like. If the process 400 determines to project the content again, then the process repeats operations 410 and 412. If, however, the process 400 determines not to project the content again, then at 416 the process 400 determines whether to clear the display medium or whether to simply allow the image to naturally decay from the display medium. If the process 400 determines to clear the display medium, then at 418 the process projects light effective to clear the display medium. If not, then at 420 the process 400 ends and the image substantially or entirely disappears from the display medium over time and according to the decay rate of the medium.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a projector, coupled to the one or more processors;
   a camera, coupled to the one or more processors and configured to capture one or more images of a display medium; and
   one or more computer-readable media storing computer-executable instructions that, when executed by the one or more processors, cause the one or more processors to perform acts comprising:
   identifying, using the one or more images captured by the camera, information displayed on the display medium;
   determining content that is supplemental to the identified information;
   retrieving the supplemental content; and
   instructing the projector to periodically project light onto the display medium to display the identified information and the supplemental content on the display medium, wherein the period at which the light is projected is based, at least in part, on a rate at which displayed content decays from the display medium.

2. The system as recited in claim 1, wherein the display medium is configured to display the identified information and the supplemental content for at least one minute after the projector ceases projecting the light onto the display medium.

3. The system as recited in claim 1, wherein
   the display medium comprises phosphorescent material, fluorescent material, or a combination thereof.

4. The system as recited in claim 1, wherein the instructing comprises instructing the projector to project different wavelengths of light for causing the display medium to display at least one of the identified information or the supplemental content in different colors.

5. The system as recited in claim 1, the acts further comprising instructing the projector to cease projecting the light to allow the identified information and the supplemental content to substantially or entirely decay from the display medium.

6. A method comprising:
   under control of one or more computing systems configured with executable instructions,
   periodically projecting light onto a passive display medium for displaying content on the passive display medium, wherein the period at which the light is projected is based, at least in part, on a rate at which displayed content decays from the passive display medium; and ceasing the projecting of the light onto the passive display medium, the passive display medium continuing to display the content after the ceasing.

7. The method as recited in claim 6, wherein the passive display medium comprises phosphorescent material or fluorescent material, the passive display medium being configured to display the content after the ceasing for a finite amount of time, the content substantially or completely decaying from the passive display medium after the finite amount of time.

8. The method as recited in claim 6, wherein the passive display medium comprises phosphorescent material or fluorescent material, the light from the projecting energizes particles of the passive display medium such that the passive display medium displays the content for a finite amount of time, and the content decays over the finite amount of time.

9. The method as recited in claim 6, the acts further comprising reprojecting the light onto the passive display medium after the ceasing.

10. The method as recited in claim 6, the acts further comprising:
imaging the passive display medium prior to the projecting; and
identifying information on the passive display medium based at least in part on the imaging, the content based, at least in part, on the information.

11. The method as recited in claim 10,
wherein the information was drawn upon the passive display medium by a user.

12. The method as recited in claim 10, wherein the content substantially replicates the information.

13. The method as recited in claim 6, wherein the passive display medium comprises a first display medium, and the acts further comprising:
imaging a second display medium prior to the projecting; and
identifying additional information on the second display medium based at least in part on the imaging, the content also based, at least in part, in the additional information.

14. A method comprising:
under control of one or more computer systems configured with specific executable instructions,
projecting first light onto a display medium, the first light to energize particles of the display medium to cause display of a first image;
stopping the projecting of the first light, the display medium continuing to display the first image after the stopping; and
projecting second light onto the display medium after the stopping, the second light to energize the particles of the display medium to cause display of a second image.

15. The method as recited in claim 14, wherein the first image and the second images are the same or different images.

16. The method as recited in claim 14, wherein the display medium comprises phosphorescent material, fluorescent material, or a combination thereof.

17. The method as recited in claim 14, further comprising calculating how often to project light onto the display medium, the calculating based at least in part on a characteristic of the display medium.

18. The method as recited in claim 17, wherein the characteristic comprises a rate at which images decay from the display medium when light is projected upon the display medium.

19. The method as recited in claim 17,
further comprising:
capturing one or more images of the display medium;
identifying, from the one or more images, content on the display medium; and
selecting the first light prior to the projecting of the first light based at least in part on the content on the display medium.

20. The method as recited in claim 14, wherein:
the display medium comprises an electronic paper display that includes multiple capsules and multiple particles within each of the multiple capsules;
the first light alters a location of the particles within the respective capsules to cause the electronic paper display to display the first image; and
the second light alters the location of the particles within the respective capsules to cause the electronic paper display to display the second image.

21. The method as recited in claim 20, wherein the multiple capsules each include or are associated with a respective photocell, the photocells for receiving the first and second light and altering the locations of the particles within the capsules.

22. A system comprising:
one or more processors;
a projector, coupled to the one or more processors;
a camera, coupled to the one or more processors and configured to capture one or more images of a display medium; and
one or more computer-readable media storing computer-executable instructions that, when executed by the one or more processors, cause the one or more processors to perform acts comprising:
identifying, using the one or more images captured by the camera, information displayed on the display medium;
determining content to display on the display medium based at least in part on the identified information displayed on the display medium; and
instructing the projector to periodically project light onto the display medium to display the content on the display medium, wherein the period at which the light is projected is based, at least in part, on a rate at which displayed content decays from the display medium, wherein the instructing comprises instructing the projector to project different wavelengths of light for causing the display medium to display the content in different colors.

23. The system as recited in claim 22, wherein the display medium is configured to display the content for at least one minute after the projector ceases projecting the light onto the display medium.

24. The system as recited in claim 22, wherein the display medium comprises phosphorescent material, fluorescent material, or a combination thereof.

25. The system as recited in claim 22, the acts further comprising instructing the projector to cease projecting the light to allow the content to substantially or entirely decay from the display medium.

26. A method comprising:
under control of one or more computing systems configured with executable instructions, imaging a display medium;
identifying information on the display medium, wherein the information was drawn upon the display medium by a user;
periodically projecting light onto the display medium for displaying content on the display medium, wherein the content is based, at least in part, on the information and the period at which the light is projected is based, at least in part, on a rate at which displayed content decays from the display medium; and
ceasing the projecting of the light onto the display medium, the display medium continuing to display the content after the ceasing.

27. The method as recited in claim 26, wherein the display medium comprises phosphorescent material or fluorescent material, the display medium being configured to display the content after the ceasing for a finite amount of time, the content substantially or completely decaying from the display medium after the finite amount of time.

28. The method as recited in claim 26, wherein the display medium comprises phosphorescent material or fluorescent material, the light from the projecting energizes particles of the display medium such that the display medium displays the content for a finite amount of time, and the content decays over the finite amount of time.

29. The method as recited in claim 26, the acts further comprising reprojecting the light onto the display medium after the ceasing.

30. The method as recited in claim 26, wherein the
display medium comprises a first display medium, and the acts further comprising: imaging a second display medium prior to the projecting; and identifying additional information on the second display medium based at least in part on the imaging, the content also being based, at least in part, on the additional information.

31. A method comprising:
under control of one or more computing systems configured with executable instructions,
imaging a first display medium;
identifying information on the first display medium;
periodically projecting light onto a second display medium for displaying content on the second display medium, wherein the content is based, at least in part, on the information and the period at which the light is projected is based, at least in part, on a rate at which displayed content decays from the second display medium; and
ceasing the projecting of the light onto the second display medium, the second display medium continuing to display the content after the ceasing.

32. The method as recited in claim 31, wherein the second display medium comprises phosphorescent material or fluorescent material, the second display medium being configured to display the content after the ceasing for a finite amount of time, the content substantially or completely decaying from the second display medium after the finite amount of time.

33. The method as recited in claim 31, wherein the second display medium comprises phosphorescent material or fluorescent material, the light from the projecting energizes particles of the second display medium such that the second display medium displays the content for a finite amount of time, and the content decays over the finite amount of time.

34. The method as recited in claim 31, the acts further comprising reprojecting the light onto the second display medium after the ceasing.

35. The method as recited in claim 31, wherein the information was drawn upon the first display medium by a user.

36. The method as recited in claim 31, wherein the content substantially replicates the information.

* * * * *